June 26, 1962
R. S. YAROSZ
3,040,434
ROTATABLE WORK TABLE
Filed Jan. 31, 1958
2 Sheets-Sheet 1
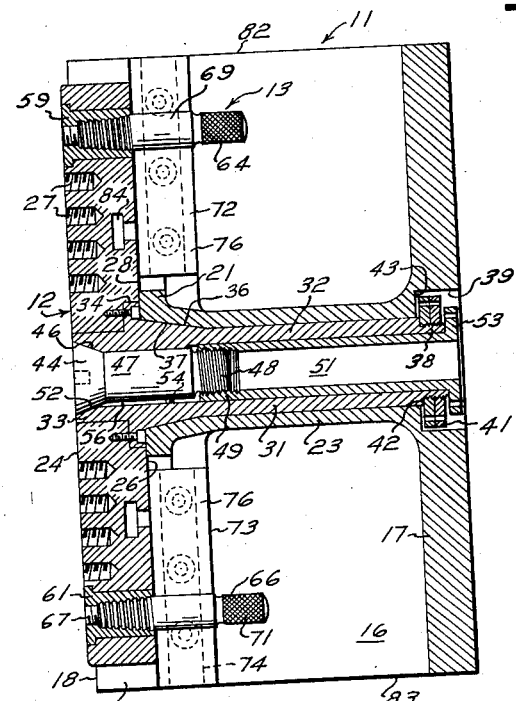
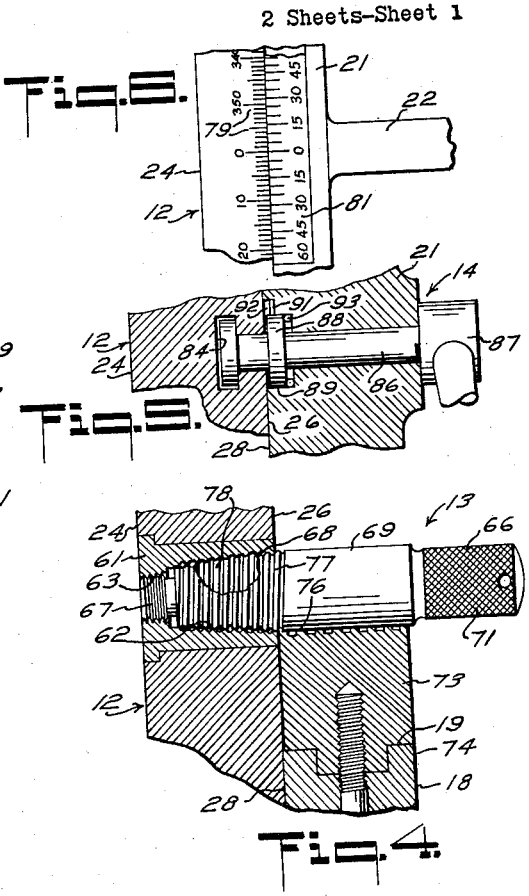
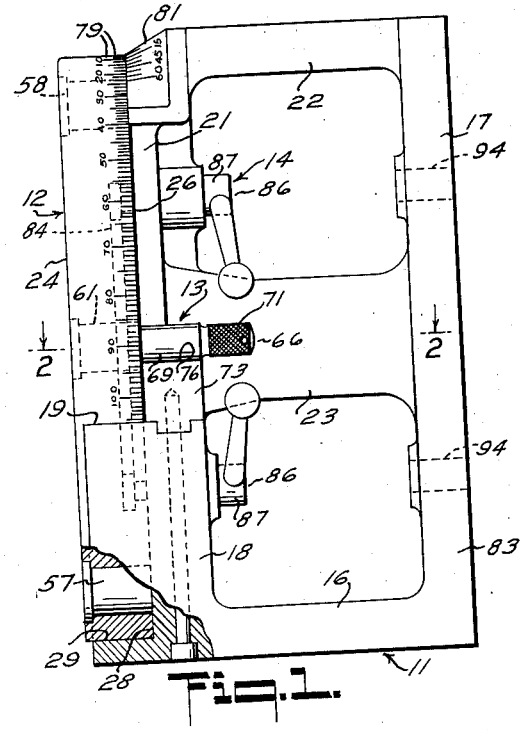
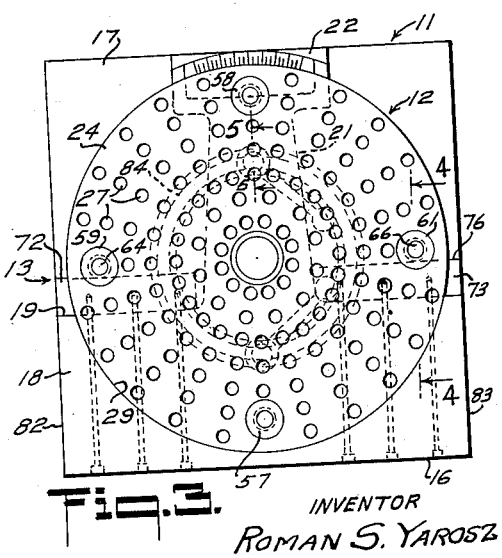
INVENTOR
ROMAN S. YAROSZ
BY
Gardner & Zimmerman
ATTORNEYS

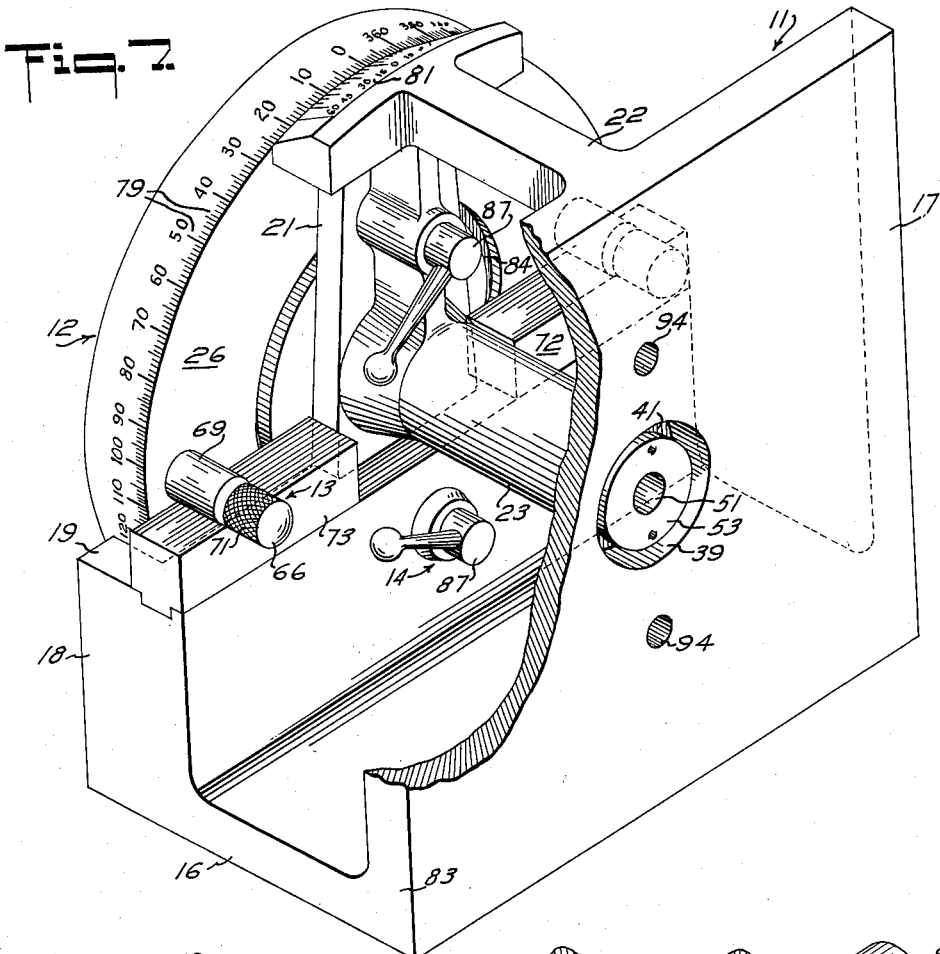
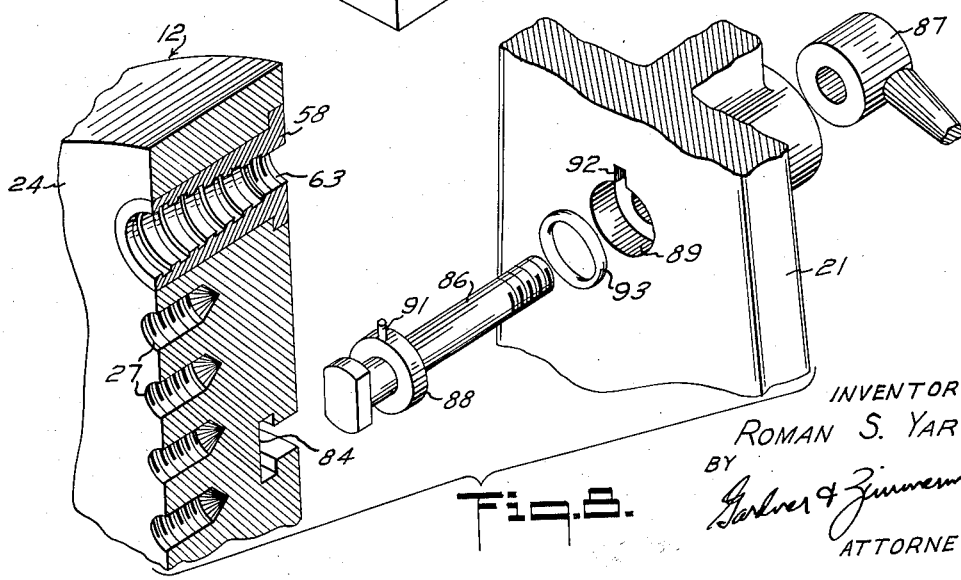

United States Patent Office 3,040,434
Patented June 26, 1962

3,040,434
ROTATABLE WORK TABLE
Roman S. Yarosz, 725 Dutton Ave., San Leandro, Calif.
Filed Jan. 31, 1958, Ser. No. 712,553
6 Claims. (Cl. 33—174)

This invention relates to work tables used in machine shop practice and is more particularly directed towards a rotary angle plate or work table adapted to support and releasably engage jig plates, dies, or other types of work pieces so as to facilitate the laying out of templates or the scribing of die-plates, patterns, etc. thereon, and which is designed to be selectively used in conjunction with subsequent tooling operations.

It is therefore an object of my invention to provide a work table which will facilitate the locating of various holes and other delineations on a work piece mounted thereon without the necessity of repositioning the work piece.

Another object of my invention is to provide a device of the character described which is adapted for use as a work holder for a work piece in subsequent tooling or machining operations.

A further object of this invention is to provide means for selectively positioning such work table in order to measure and indicate angles on a work piece clamped thereon.

A still further object of my invention is to provide a work table in which complementary angles may be accurately located on a work piece by repositioning the work table.

Yet another object of my invention is to provide suitable means for maintaining the work piece supporting member in a locked position relative to the table while scribing or subsequent operations are being carried out on the work piece.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

FIGURE 1 is a side elevational view of the work table embodying this invention.

FIGURE 2 is a cross-sectional view taken substantially on the line 2—2 of FIGURE 1.

FIGURE 3 is an end elevational view thereof, but on a reduced scale.

FIGURE 4 is a portional vertical cross-section view on an enlarged scale and taken substantially on the line 4—4 of FIGURE 3.

FIGURE 5 is a portional vertical cross-section taken substantially on the line 5—5 of FIGURE 3.

FIGURE 6 is a portional top plan view on an enlarged scale showing the vernier scale of the device.

FIGURE 7 is a rear perspective view of the work table, shown on an enlarged scale.

FIGURE 8 is an exploded perspective view of a portion of the apparatus.

In broad terms, the invention comprises a support means 11 adapted to be positioned on one of two normally related supporting surfaces or bases thereof, and a rotatably adjustable angle plate or turntable 12 to which may be secured a work piece, the turntable being journalled in the supporting means 11. There is additionally provided locating means 13 for setting up work on an accurate center line and for ascertaining absolute angles in degrees, and a locking mechanism 14 to secure the angle plate in selected fixed positions relative to the support means 11. In accordance with the teachings of the present invention the support means 11 is here shown as a work block having a base 16 upon which the device rests for most layout work. Extending from one edge of the base and at right angles thereto is an end wall 17 which is utilized as an alternative base during various tooling operations. The base 16 is also provided at an edge opposite the end wall 17 with a plate member 18 which extends at right angles to the base for less than half the height of the end wall 17.

Extending vertically (when the apparatus is positioned as viewed in the drawing) from a medial portion of a horizontally disposed face 19 of the plate member is an arm 21 which terminates in a common plane with the upper end of the wall 17. A bridging member 22 interconnects at right angles the arms 21 and the wall 17 to insure parallel spaced relation therebetween. Located centrally of the end wall 17 and extending at right angles between the wall and the arm 21 is a hollow post 23 in which the turntable 12 is operatively mounted. The turntable 12 is here shown as a thick metal disc having an exposed flat work face 24 and a similar flat rear surface 26 in spaced parallel relation thereto. The work face 24 is provided with a plurality of threaded holes 27 arranged concentrically about the center of the turntable and adapted to receive clamping means (not shown) by which a work piece may be secured in selected portions on the table. The turntable is positioned adjacent the plate member 18 and the arm 21, the surface 26 of the turntable being in parallel relation to an outer surface 28 of the plate member and the arm. It will be noted here that the plate member 18 is milled out to provide an arcuate offset 29 within which a portion of the turntable is positioned to serve as a rotational guide therefor.

The turntable is mounted in the work block by means of a hollow shaft or sleeve 31, the main body portion 32 of which is positioned within the bore of the post 23. An end 33 of the shaft 31 extends exteriorly of the post and is adapted to fit in a center bore provided in the turntable 12 which extends therethrough from the face 24 to the surface 26. A radially extending flange 34 provided adjacent the end 33 of the shaft seats in a counter bore which is formed in the turntable and which extends from the surface 26 thereof. Bolts or the like, passing through holes in the flange 34 threadedly engage the turntable to secure the same to the shaft in a plane substantially normal to the work face 24. Extending from adjacent the flange 34 toward the wall 17 of the support means the shaft 31 tapers inwardly as indicated at 36 to the main body portion 32 and such tapered portion engages a similarly tapered bore 37 provided in the post 23. The shaft 31 terminates in a reduced threaded end portion 38, which is operatively positioned within a counter bore 39 provided in the end wall 17 of the supporting means. Threaded on the end portion 38 are lock nuts 41 which engage a shoulder 42 formed on the shaft 31 at the juncture of the main body portion with the reduced end thereof. A surface 43 in the counter bore 39 provides stop means in conjunction with the lock nuts 41 to prevent lateral displacement of the shaft 31.

It will thus be seen that the shaft is rotatably journalled in the post 23 since the shoulder 42 of the shaft extends beyond the surface 43 of the counter bore 39 to provide sufficient clearance between the surface 43 and the lock nuts to permit free rotation of the shaft and the turntable.

It will be appreciated that extremely accurate measurements are often required when laying out a work piece such as a jig plate or a die. In accordance therewith, means are provided for maintaining the turntable 12 in an accurately centered position notwithstanding normal wear on the parts or stresses applied thereto during various tooling operations. As here shown, such means includes a collet 44, one end of which is tapered inwardly as indicated at 46 to a main body portion 47 of the collet, while the opposite end 48 thereof is threaded to engage an internally threaded end 49 of a draw bar 51. As shown in FIGURE 2 the collet 44 is inserted in the shaft 31 through the open end 33 thereof and the shaft is provided with a tapered bore 52 adapted to engage the tapered end 46 of the collet. The draw bar 51 is introduced into the shaft 31 at the reduced end 38 thereof for operative engagement with the threaded end 48 of the collet. It will be noted that the free end of the draw bar is flanged as at 53 for engagement with a surface on the end 38 of the shaft 31 in order to draw the collet into operative engagement with the shaft. The draw bar may be adjusted by means of a tightening tool inserted in spaced holes bored in the flange 53.

It will be apparent from the above description that tightening the draw bar 51 on the threaded end 48 will pull the collet against the tapered bore 52 of the shaft thereby expanding the shaft end 33 which is positioned within the center bore of the turntable so as to provide a firm wedging engagement therebetween. The collet is prevented from turning with the draw bar by means of a pin 54 extending radially of the body portion 47 which fits into a slot or keyway 56 provided in the bore of shaft 31.

Means are provided for setting up work on an exact center line and ascertaining angles to be scribed or otherwise indicated on a work piece clamped to the turntable in a manner now to be described. The turntable 12 is provided with two pairs of diametrically opposed bores into which are fitted two pairs of hardened steel bushings designated at 57, 58, 59 and 61. As best seen in FIGURE 4, each bushing is provided with a tapered bore 62 which terminates at one end thereof in a reduced threaded portion 63. The bores in the bushings are adapted to receive one of two locating pins 64 and 66 each of which is provided with a reduced threaded end 67 adapted to engage the threads 63, while an intermediate portion of the pin tapers outwardly as at 68 for engagement with the tapered bores 62, thereafter continuing in the form of a cylindrical shank portion 69. A knurled head 71 is provided at the distal end of the pin with a transverse bore therethrough for the insertion of a tightening tool. As previously mentioned, the plate member 18 projects from the base 16 less than half the height of the wall 17 and terminates in the face 19 some distance below the center of the turntable 11 as viewed in FIGURES 1, 3 and 7. The face 19 has provided longitudinally thereof and disposed on either side of the medially positioned arm 21, two hardened steel anvils 72 and 73 which are positioned adjacent the surface 26 of the turntable but spaced therefrom a sufficient amount to prevent friction therebetween. Each anvil has formed on one side thereof a dovetail 74 which fits into a groove provided in the face 19, and bolts extending through the plate 18 in a plane parallel to the surfaces 24 and 26 of the turntable engage threaded holes bored in the dovetail 74 to maintain the spacers in accurate alignment.

To locate a center line on a work piece operatively secured to the turntable, the operator need only thread the two locating pins 64 and 66 into the pair of diametrically opposed bushings 59 and 61 with the shanks 69 of the pins bearing against a surface 76 of the anvils 72 and 73. It will be seen that the bushings 59 and 61 and the turntable 12 are located on a common center line and upon insertion of the pins in the bushings the turntable is maintained in a fixed position to prevent rotational movement thereof.

Angles on a work piece may be speedily ascertained in a slightly different manner when a high degree of accuracy is not of paramount importance. Thus, after the center line has been indicated on the work piece the locating pin 64 is removed from the turntable and a block of known angular measurement, such as is commonly used in the art, is interposed between the anvil 73 and the pin 66 which is still positioned in the bushing 61. In this way any angle up to in the order of forty-five degrees may be readily obtained with sufficient accuracy for many types of work. In case an obtuse angle is to be measured, the method is varied only in that the pin 66 is removed from the turntable while the pin 64 is left in position and a block whose angular measurement is equal to the complement of the obtuse angle is disposed between the anvil 72 and the pin 64.

It will also be noted that means are provided to prevent inaccuracies occurring due to grease or dirt collecting on the tapers 68 of the locating pins and/or in the tapered bores 62 of the bushings, such means comprising self-cleaning grooves 77 in the tapered portions 68 which are inclined in opposed relation to similar grooves 78 formed in the tapered bores 62 into which the grease or dirt will be collected. Similarly, self-cleaning grooves are provided in the surface 76 of the anvils 72 and 73.

In some instances angles accurate to a few seconds must be indicated on a work piece and means are provided therefor by calibrations 79 being marked through 360 degrees on the outer periphery of the turntable 12 which line up with a vernier scale 81 fixed adjacent the calibrations on an end portion of the bridging member 22. Therefore, any desired angle may be measured after removing the locating pins 64 and 66 from the bushings 59 and 61 by simply rotating the turntable until the desired reading in degrees lines up on the vernier scale. The turntable may then be locked in such a position in a manner later to be described.

An important feature of the invention is that complementary angles may be readily ascertained when the work table is positioned on the base 16 by turning the table 90 degrees in either direction to rest on either adjacent side. In accordance therewith it will be seen that opposed edges of the end wall 17 and the plate member 18 which extend at right angles from the base 16 are coterminous with one another to provide sides 82 and 83 on the support means which are accurately surfaced to be equidistant from the center of the turntable.

It is often desirable as operations on a work piece is carried out to lock the turntable in a fixed position relative to the support means. In accordance therewith, the locking mechanism 14 is provided wherein a circular T-groove 84 extends from the surface 26 of the turntable and is spaced radially from the center thereof. Two diametrically opposed locking pins 86 provided with T-shaped heads are positioned for locking engagement in the groove 84 and are mounted in the plate 18 and the arm extension 21 of the support means respectively, the free ends of said pins extending exteriorly of the plate and arm where they threadedly engage lock nuts 87 provided with handles to facilitate tightening or loosening thereof. As seen in FIGURE 5, means are provided to maintain the T-head of each pin 86 in engagement with the groove when the nut is threaded on the pin, such means including a radially extending flange 88 secured to the pin 86 and positioned in a bore 89 provided in the plate 18 and the arm 21 respectively. A radially extending pin 91 fixed in the outer periphery of the flange 88 is retained in a groove 92 to prevent turning of the pin. It will be noted that a rubber O-ring 93 is positioned in the bore 89 adjacent the flange 88 so as to eliminate friction of the clamping bolts and rotary table and insure a uniform pressure by the pin head against portions of the groove when the nuts 87 are tightened to lock the turntable.

The work table of my invention can also be used as a holder for a work piece in conjunction with other tools such as a drill press or a milling machine. In this case the device is positioned on the wall 17 which thus serves as an alternative base wherein diametrically opposed apertures 94 provided in the wall 17 receive bolts or the like for clamping the work table securely in place on a metal working tool.

What is claimed is:

1. Apparatus of the character described comprising a disc-like member having a relatively flat exposed front surface against which a work piece may be positioned, said member having four openings disposed at ninety degrees from each other on radii of the member, each of said openings having cylindrical threads adjacent said front surface with a diverging tapered portion extending from said threads rearwardly through said member, each tapered portion having angularly disposed self-cleaning grooves formed therein, means adjacent the rear surface of said member supporting said member for rotation about an axis normal to and centrally of said member, said means including a pair of normally related supporting surfaces on which said means may be selectively placed in self supporting relationship and including a planar surface disposed in parallel spaced relation to said member, a pair of pins having reduced threaded ends releasably engaged with the cylindrical threads of a diametrically opposed pair of said openings, said pins having tapered portions adjacent their threaded ends in engagement with the diverging tapered portions of said pair of openings, said pins having their tapered portions provided with self-cleaning grooves angularly disposed in opposed relation to the grooves in said tapered bores, and stop means engageable with aligned peripheral portions of the respective pins in one position of rotation of said member and preventing further rotation thereof.

2. Apparatus as set forth in claim 1 including means locking said member against rotation independent of said pins and said stop means.

3. Apparatus of the character described comprising a disc like member having a relatively flat exposed surface against which a work piece may be positioned, said member having a pair of diametrically positioned threaded pin receiving means adjacent said exposed surface and outwardly tapered bores extending from said pin receiving means through said member, said tapered bores having angularly disposed self-cleaning grooves formed therein, means supporting said member for rotation about an axis normal to and centrally of said member, a pair of pins having reduced threaded ends releasably engageable with said pin receiving means, said pins having medially positioned tapered shank portions for engagement with said tapered bores and extending axially beyond the other surface of said member, said shank portions having angularly disposed self-cleaning grooves in opposed relationship to the grooves in said tapered bores, and stop means engageable with aligned peripheral surfaces of said shank portions in one position of rotation of said member and preventing further rotation thereof.

4. Apparatus of the character described including a member having a relatively flat exposed surface against which a work piece may be positioned, a work block operatively supporting said member for rotation about an axis centrally of and normal to said member, means defining a continuous T-shaped groove in said member disposed concentrically about said axis and extending from the other surface of said member, a locking pin operatively carried by said work block and having a T-shaped head in engagement with said groove for sliding movement therealong, said work block having a bore receiving said pin, said bore having an enlarged recess adjacent said member with an axial keyway in radial communication with the recess, said pin having a radial flange spaced from said head and disposed in said recess, said flange having a radial pin engaging said keyway to prevent rotation of the pin from a position wherein said head is restrained from removal from said groove, and a lock nut threadedly engaging the distal end of said locking pin relative to said head and abutting said work block for securing said member against rotation.

5. Apparatus as defined by claim 4, further defined by a resilient O-ring disposed at the base of said recess adjacent said flange.

6. Apparatus of the character described comprising a disc-like member having a relatively flat exposed surface against which a work piece may be positioned and a parallel flat opposed surface, a work block operatively supporting said member for rotation about an axis centrally of and normal to said member, said member having a plurality of openings with at least two of said openings being diametrically opposed, a plurality of bushings with one disposed within each of said openings and having flat exposed ends coterminous with the flat surfaces of said member, said bushings having threaded pin-receiving means located on a common axis with said bushings and outwardly tapered bores disposed centrally of said bushings and extending from said pin-receiving means, said tapered bores having angularly disposed self-cleaning grooves provided therein to maintain said bores free of grease and dirt, a pair of pins having reduced threaded ends releasably engageable with said pin-receiving means, said pins being tapered adjacent said threaded ends for engagement with said tapered bores, said pins having their tapered portions provided with self-cleaning grooves angularly disposed in opposed relationship to the grooves in said tapered bores, and a pair of elements engageable with aligned peripheral portions of the respective pins in one position of rotation of said member.

References Cited in the file of this patent

UNITED STATES PATENTS

| | | |
|---|---|---|
| 1,295,982 | Hanton | Mar. 4, 1919 |
| 1,355,809 | Bryant | Oct. 19, 1920 |
| 1,798,513 | Zerk | Mar. 31, 1931 |
| 2,309,142 | Stafford | Jan. 26, 1943 |
| 2,324,476 | Becker | July 20, 1943 |
| 2,345,312 | Sorensen | Mar. 28, 1944 |
| 2,369,425 | Becker | Feb. 13, 1945 |
| 2,406,906 | Saunders | Sept. 3, 1946 |
| 2,555,351 | Lowe | June 5, 1951 |
| 2,692,462 | Robertson | Oct. 26, 1954 |